United States Patent [19]
Wolfe

[11] Patent Number: 5,471,244
[45] Date of Patent: Nov. 28, 1995

[54] AUTOMATIC DARK LEVEL ZEROING FOR AN ANALOG VIDEO SIGNAL

[75] Inventor: Kenneth I. Wolfe, Maplewood, Minn.

[73] Assignee: 3M Company, St. Paul, Minn.

[21] Appl. No.: 250,820

[22] Filed: May 31, 1994

[51] Int. Cl.[6] ................................................. H04N 5/16
[52] U.S. Cl. ........................ 348/257; 348/255; 348/691
[58] Field of Search .................................... 348/257, 243, 348/255, 258, 260, 678, 686, 691, 693; 358/171, 163; H04N 5/52, 5/16, 5/20, 9/64, 9/07

[56] References Cited

U.S. PATENT DOCUMENTS

| | | |
|---|---|---|
| 3,976,836 | 8/1976 | Wheeler . |
| 4,388,648 | 6/1983 | Harwood et al. . |
| 4,525,741 | 6/1985 | Chahal et al. . |
| 4,549,215 | 10/1985 | Levine . |
| 4,635,118 | 1/1987 | Batra et al. . |
| 4,712,010 | 12/1987 | Alm . |
| 4,713,694 | 12/1987 | Zwirn . |
| 4,963,963 | 10/1990 | Dorman . |
| 4,994,917 | 2/1991 | Takayama . |
| 5,010,408 | 4/1991 | Toohey . |
| 5,086,343 | 2/1992 | Cook et al. . |
| 5,101,271 | 3/1992 | Andrews et al. . |
| 5,105,276 | 4/1992 | Schrock . |
| 5,181,118 | 1/1993 | Kimura . |

FOREIGN PATENT DOCUMENTS

| | | |
|---|---|---|
| 0424111 | 4/1991 | European Pat. Off. . |
| 0483837 | 5/1992 | European Pat. Off. . |
| WO89/10037 | 10/1989 | WIPO . |

*Primary Examiner*—Victor R. Kostak
*Assistant Examiner*—Sherrie Hsia
*Attorney, Agent, or Firm*—Patterson & Keough

[57] ABSTRACT

An automatic dark level zeroing circuit removes a dark level DC bias from an analog video signal generated by a charge-coupled device (CCD) camera, The automatic dark level zeroing circuit is DC-coupled to the CCD camera such that there is no loss of low frequency information in the analog video signal, The automatic dark level zeroing circuit forms an adaptive feedback loop that removes the dark level DC bias from the analog video signal by using a sampled value of the analog video signal that represents an internally masked pixel to produce a zero correction signal that is then combined with the analog video signal to remove the dark level DC bias without removing any useful video information or otherwise altering the information content of the analog video signal,

13 Claims, 6 Drawing Sheets

AUTOMATIC DARK LEVEL ZEROING FOR AN ANALOG VIDEO SIGNAL

RELATED APPLICATIONS

This application relates to a co-pending application assigned to the assignee of the present invention and filed in the United States Patent and Trademark Office concurrently herewith entitled "Web Inspection System Having Enhanced Video Signal Preprocessing", Ser. No. 08/251,375, which is incorporated by reference in the present application.

FIELD OF THE INVENTION

The present invention relates generally to video signal preprocessing and, more particularly, to a DC-coupled, automatic dark level zeroing circuit for removing a dark level DC bias from a raw analog video signal generated by a charge-coupled device (CCD) camera.

BACKGROUND OF THE INVENTION

In video image cameras that utilize charge-coupled devices (CCDs) as the mechanism for transferring a detected signal out of a sensor scan array in the camera, it is often necessary to process the raw video signal developed by the CCD camera before useful image information can be extracted. One of the steps in processing the raw video signal is to remove a dark level DC bias from the raw video signal. To understand this process, it is necessary to understand something about both the way in which the raw video signal is generated by the CCD camera and the manner in which the video signal will be utilized once it has been processed.

Typically, the information portion of the video output signal generated by a CCD camera consists of a voltage signal referred to as the pedestal. During a first portion of the camera scan time, light striking a photosite in the scan array will discharge or decrease a reference charge level to which the photosite has been precharged. During a second portion of the camera scan time, the charge level remaining at the photosite is transferred out of the scan array using the charge-coupled device read out mechanism. Thus, the pedestal is the difference between the reference charge level or dark level and the charge level that remains at the end of the first portion of the camera scan time.

The reference charge level is sometimes referred to as a black level or dark level voltage value because if no light is received at a photosite during the first portion of the camera scan time, then the charge level remaining at that photosite which represent a dark or no light condition is equal to the reference charge level to which the photosite was initially charged. A fully discharged photosite, on the other hand, is said to be in a state of saturation; however, even when in the saturation state a certain amount of charge will remain at the photosite. The differences in charge levels contained in the pedestal signal are representative of differences in light received by different photosites from different locations in the focal plane of the CCD camera and will cover a defined range of voltage values for a particular CCD camera. In the raw video output signal from the CCD camera, this defined range of voltage values is riding on a DC bias or DC offset voltage that is equivalent to the dark level voltage value a DC bias or dark level offset on which the useful video information rides. Depending upon whether the reference voltage to which the photosites are initially charged is positive or negative, this DC bias may be either a positive or negative value. In other words, the useful range of information in the video signal representative of the amount of light received by a photosite during one camera scan time, such a signal varying between 0 V and 1 V, for example, is positioned on top of the DC bias signal of −4 V, for example. As a result, the voltage value of the raw video signal in this example would vary between −4 V and −3 V.

In many applications, once a raw video output signal has been produced by the CCD camera, the video output signal is then supplied to some type of analog-to-digital (A/D) converter so as to generate a stream of digital bits representative of the video image seen by the CCD camera. In high fidelity applications, such as vision inspection systems or high quality image reproduction, it is desirable to maintain both the information content of both the analog and digital versions of the video signal as pure as possible without introducing errors or noise into the signal.

Because the accuracy of A/D converters is a function of the voltage range of the input signal, it is preferable to remove the dark level value as a DC bias from the video output signal before the analog-to-digital conversion is performed. If the dark level value is not removed, then a large portion of the accuracy of the A/D converter is lost in converting the DC bias value represented by the dark level value, rather than in obtaining a higher resolution conversion of the voltage differences from the dark level value which actually represent the useful information in the video output signal. As a result, some type of dark level compensation circuitry is usually included within the video preprocessing circuit that is typically part of the CCD camera so as to compensate for the dark level value before an A/D conversion is performed.

The most prevalent type of dark level compensation circuitry is a DC restoration circuit that reinserts the DC component of the raw video signal after the DC bias has been removed by way of an AC coupling in the form of a high pass capacitive filter. Examples of DC restoration circuits for AC coupled video signals are shown in U.S. Pat. Nos. 3,976,836, 4,549,215, 4,712,010, 4,713,694, and 4,963,963. The problem with DC restoration circuits is that low frequency information in the video signal is often lost to the low pass capacitive filter that AC couples the raw video signal to the preprocessing circuit.

Another possible type of dark level compensation circuit is a circuit which subtracts a fixed reference voltage from the raw video signal. While this solution is DC coupled and hence does not lose low frequency information in the video signal, it necessarily introduces a significant amount of error into the raw video signal because the dark level value will never be a constant fixed value that is identical to the fixed reference voltage which is subtracted from the raw video signal. Drift and variation in the dark level voltage value will be caused by changes in temperature, pixel clock frequency, and ambient conditions, as well as from camera to camera. For high fidelity applications where the introduction of any noise or error into the video signal is undesirable, this solution is simply not viable.

A variation on the circuit which subtracts a fixed reference voltage is shown in U.S. Patent No. 5,010,408 where the reference voltage is a sampled voltage. In this case, the subtraction is accomplished using a differential amplifier which is connected in an open loop to receive the raw video signal. As with the previously discussed technique, this circuit does not compensate for offset variation the CCD camera. In addition, any amplification of the video signal following the differential amplifier will reintroduce a variable offset voltage into the raw video signal.

Another type of DC coupled preprocessing circuit sometimes used for video signals is a peaking control circuit, such as shown in U.S. Pat. Nos. 4,388,648 and 4,635,118. U.S. Pat. No. 4,994,917 shows another type of preprocessing circuit that includes a clipping circuit. Both peaking control circuits and clipping circuit, by their very nature, necessarily alter the information content of the video signal. As a result, these types of circuit are not used in high fidelity applications where the objective is to preserve the original information content of the video signal.

Still another type of dark level compensation uses digital correction values stored in a memory to correct the video signal after it has been converted to a digital video signal by an A/D conversion process. Examples of digital dark level correction include U.S. Pat. Nos. 5,086,343 and 5,181,118. The problem with compensating for the dark level bias after the A/D conversion process is that the range of the A/D converter is now used up by the large DC bias voltage. In addition, the error of any gain introduced to the raw video signal before the A/D converter cannot be compensated for after the A/D conversion process.

To solve the later problem of not being able to compensate for errors in the gain of the raw video signal prior to the A/D conversion, several dark level compensation circuits have included the A/D converter within a feedback loop. The output of the A/D converter is used by a control circuit to supply feedback to an amplifier or integrator that is included in the circuit before the A/D converter. Examples of this type of hybrid feedback loop for controlling dark level offset include U.S. Pat. Nos. 4,525,741, 5,101,271 and 5,105,276 and PCT Publ. No. WO/89/10037. While this solution addresses the problems of not being able to compensate for gain errors introduced to the raw video signal, it still does not overcome the problem of using up all of the range of the A/D converter. In addition, this type of hybrid circuit cannot compensate for errors inherent in the A/D converter.

Although existing dark level compensation circuits for a CCD camera are adequate for many video signal preprocessing requirements, these circuits have proven inadequate in applications which require high fidelity of the original raw video signal generated by the CCD camera. Consequently, a dark level compensation circuit which can remove a dark level DC bias from a raw analog video signal generated by a CCD camera without losing signal information or introducing noise into the video signal would be greatly appreciated.

SUMMARY OF THE INVENTION

The present invention is an automatic dark level zeroing circuit for removing a dark level DC bias from an analog video signal generated by a charge-coupled device (CCD) camera. The automatic dark level zeroing circuit is DC-coupled to the CCD camera such that there is no loss of low frequency information in the analog video signal. The automatic dark level zeroing circuit forms an adaptive feedback loop that removes the dark level DC bias from the analog video signal by using a sampled value of the analog video signal that represents an internally masked pixel to produce a zero correction signal that is then combined with the analog video signal to remove the dark level DC bias without removing any useful video information or otherwise altering the information content of the analog video signal.

In accordance with a first aspect of the present invention, an automatic dark level zeroing circuit for removing a dark level DC bias from an analog video signal generated by a charge-coupled device (CCD) camera, comprises a summing node that is DC-coupled to the CCD camera and combines the analog video signal and a zero correction signal to produce a zeroed video signal, a video gain amplifier connected to the summing node that amplifies the zeroed output signal in response to a user-supplied setting to produce an output video signal, a sample/hold circuit that samples the output video signal to produce a sampled video value in response to a sample command indicative of when the output video signal represents-the dark level DC bias, and a difference integrator connected to the means for sampling to subtract the sampled video value from a zero voltage value to produce the zero correction signal.

In accordance with a second aspect of the present invention, an automatic dark level zeroing circuit for removing a dark level DC bias from an analog video signal generated by a charge-coupled device (CCD) camera comprises a summing node that is DC-coupled to the CCD camera and combines the analog video signal and a zero correction signal to produce a zeroed video signal, a circuit for sampling the zeroed video signal to produce a sampled video value indicative of when the zeroed video signal represents the dark level DC bias, and a circuit for averaging the sampled video value over a plurality of scan times for the CCD camera to produce the zero correction signal. In this way, the automatic dark level zeroing circuit forms an adaptive feedback loop that removes the dark level DC bias from the analog video signal.

DESCRIPTION OF THE PREFERRED EMBODIMENT

Figure 1:
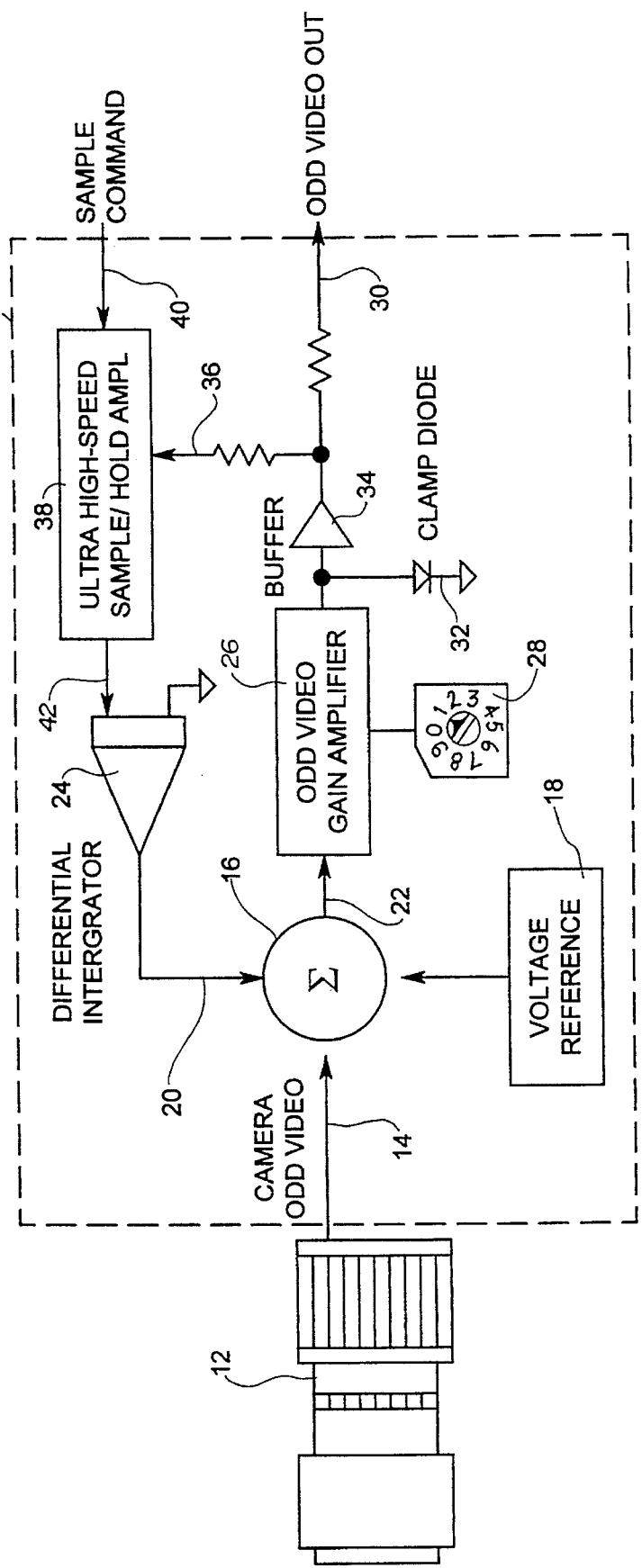
FIG. 1 is a block-level circuit diagram of an auto-zero circuit in accordance with the present invention.

Referring to FIG. 1, a detailed description of an automatic dark level zeroing circuit (auto-zero circuit) 10 will be presented. Although the description of the preferred embodiment of the present invention is limited to the particulars of a preferred implementation of auto-zero circuit 10, it will be understood that there are many applications for auto-zero circuit 10 in connection with preprocessing a raw video signal 14 as received from a charge-coupled device (CCD) camera 12. In most applications, for example, raw video signal 14 will be either an even pixel video signal or an odd video pixel signal and there will be two auto-zero circuits 10 required to process the entire raw video signal. Some CCD cameras, however, may supply a raw video signal having only a combined video pixel signal, in which case only a single auto-zero circuit 10 would be required. CCD camera 12 may be either a line scan camera or an area scan camera and the absolute value of the dark level DC bias may be either positive or negative. It will also be appreciated that auto-zero circuit 10 may be physically separate from, or integrated as part of, CCD camera 12. For a more detailed description of a preferred application of the present invention, reference is made to the previously identified co-pending application entitled "Web Inspection System Having Enhanced Video Signal Preprocessing".

Auto-zero circuit 10 is DC-coupled to a CCD camera 12 and receives a raw video signal 14 from CCD camera 12. Three signals enter a summing node 16 of auto-zero circuit 10: raw video output signal 14, a fixed reference voltage 18 and a zero correction signal 20. As indicated in the background section, raw video output signal 14 rides on a DC bias offset that varies with temperature, pixel clock frequency, and ambient conditions, and from camera to camera. In a preferred embodiment in which line scan camera is a Reticon LC1902 line scan camera, the nominal value of the DC bias offset is −3.6 volts. Consequently, fixed reference voltage 18 is chosen at +3.6 volts so as to bring the output 22 of summing node 16 to a value that should be close to zero volts, except for the variations as described above. It will be understood, however, that while the use of fixed reference voltage 18 allows for operation of the circuit components of auto-zero circuit 10 in a more optimum range, there is nothing in the present invention which requires fixed reference voltage 18 to be added at summing node 16. The primary advantage of using fixed reference voltage 18 is that a difference integrator 24 is permitted to operate in the center of its dynamic range.

A video gain amplifier 26 receives output 22 from summing node 16 and is included within the adaptive feedback loop formed by auto-zero circuit 10. In this way, amplified offset voltages of gain amplifier 26 are corrected at the same time as the dark level DC bias offset voltages. In a preferred embodiment, a switch 28 controls the gain of gain amplifier 26 in response to a user-supplied setting. By including a gain amplifier within the adaptive feedback loop, a filtered video output signal 30 can be adjusted to a level that optimizes, for example, a flash analog-to-digital (A/D) conversion which is part of the next stage of a preferred embodiment of a preprocessing circuit incorporating the present invention.

A high speed Schottky diode 32 is used to clamp the portion of video signal 14 that does not contain useful information. Without this clamp, a buffer amplifier 34 and any subsequent video amplifiers (not shown) would saturate and would have to recover before valid video could be passed through. It will be noted that valid video is always the opposite polarity from the clamped portion of video signal 14.

An output 36 of buffer amplifier 34 is sampled by a wide range, bipolar, ultra high speed sample/hold circuit 38. A sample command 40 is provided by an external processor (not shown) or timing generator (not shown) based on the timing of a desired sample pixel in video signal 14 which is representative of a dark level reference within CCD camera 12. It is preferable that sample/hold circuit 38 have a very large capture range as the polarity and value of an initial DC bias offset will not be known.

An output 42 of sample/hold circuit 38 representative of the sampled voltage is delivered to difference integrator 24 where output 42 is subtracted from 0 volts (ground). The result of this operation is that an error signal, referred to as zero correction signal 20, that is applied to summing node 16. The high open loop gain of difference integrator 24 attempts to drive output 42 to a 0 volt difference at the differential inputs of difference integrator 24 because one of the inputs is at ground, the resultant zero correction signal 20 drives output 22 representing the valid information in video signal 14 to a dark level bias of 0 volts. In this case, the only uncorrected offset terms are an amplifier offsets in difference integrator 24 and buffer amplifier 34.

In order to obtain a pixel signal from which to sample the dark level voltage, a certain number of pixel photosites within the scan array (not shown) of CCD camera 12 are physically masked by the manufacturer of the line scan camera to provide a sample region from which a dark level offset voltage may be obtained. In a preferred embodiment, the first 11 pixel photosites are masked and auto-zero circuit 10 samples the dark level offset of two masked odd pixels and averages the result to obtain the voltage that will be used to produce an error signal for an adaptive feedback loop. Preferably, pixels near the center of the masked region are used for a more accurate sample value because the dark level offset voltage at the beginning of the mask tends to be slightly low while the voltage near the end of the mask tends to be high due to the fact that the mask can leak a little.

Video gain amplifier 26 is located within auto-zero loop 10 so that any amplifier offset that might be introduced is automatically zeroed out. Setting the correct video gain is very important in order to achieve maximum signal to noise ratio in the resultant video output signal 30. Ideally, the video gain setting should provide a 100% signal at the maximum level of the A/D flash converters which are used in the next stage of preprocessing circuit where the odd and even pixel streams are combined into a single video output signal.

Figure 2:
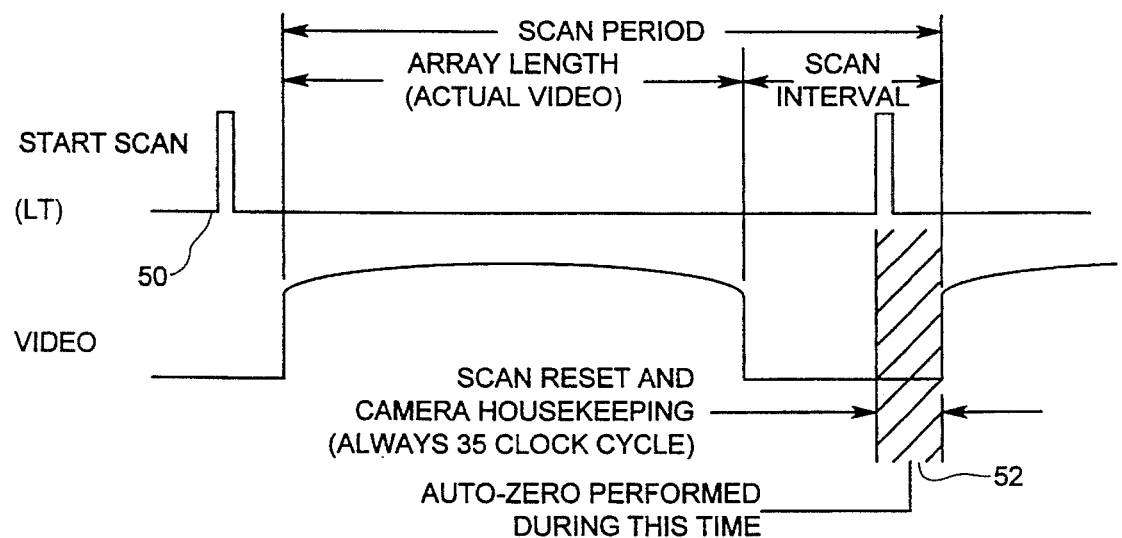
FIG. 2 is a schematic representation of the timing relationships between a raw video input signal and the operation of the auto zero circuit in accordance with a preferred embodiment of the present invention.
Figure 4:
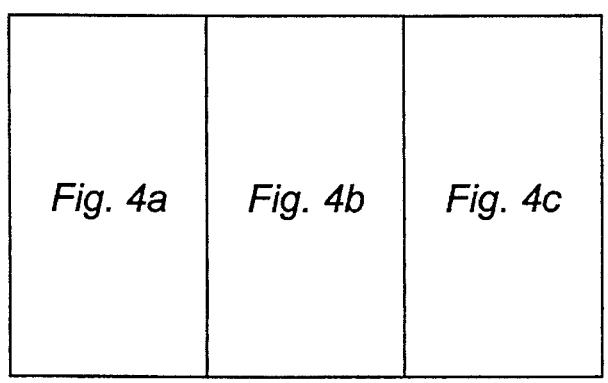
FIGS. 4a, 4b and 4c are more detailed circuit diagram of the auto-zero circuit shown in FIG. 2.
Figure 3:
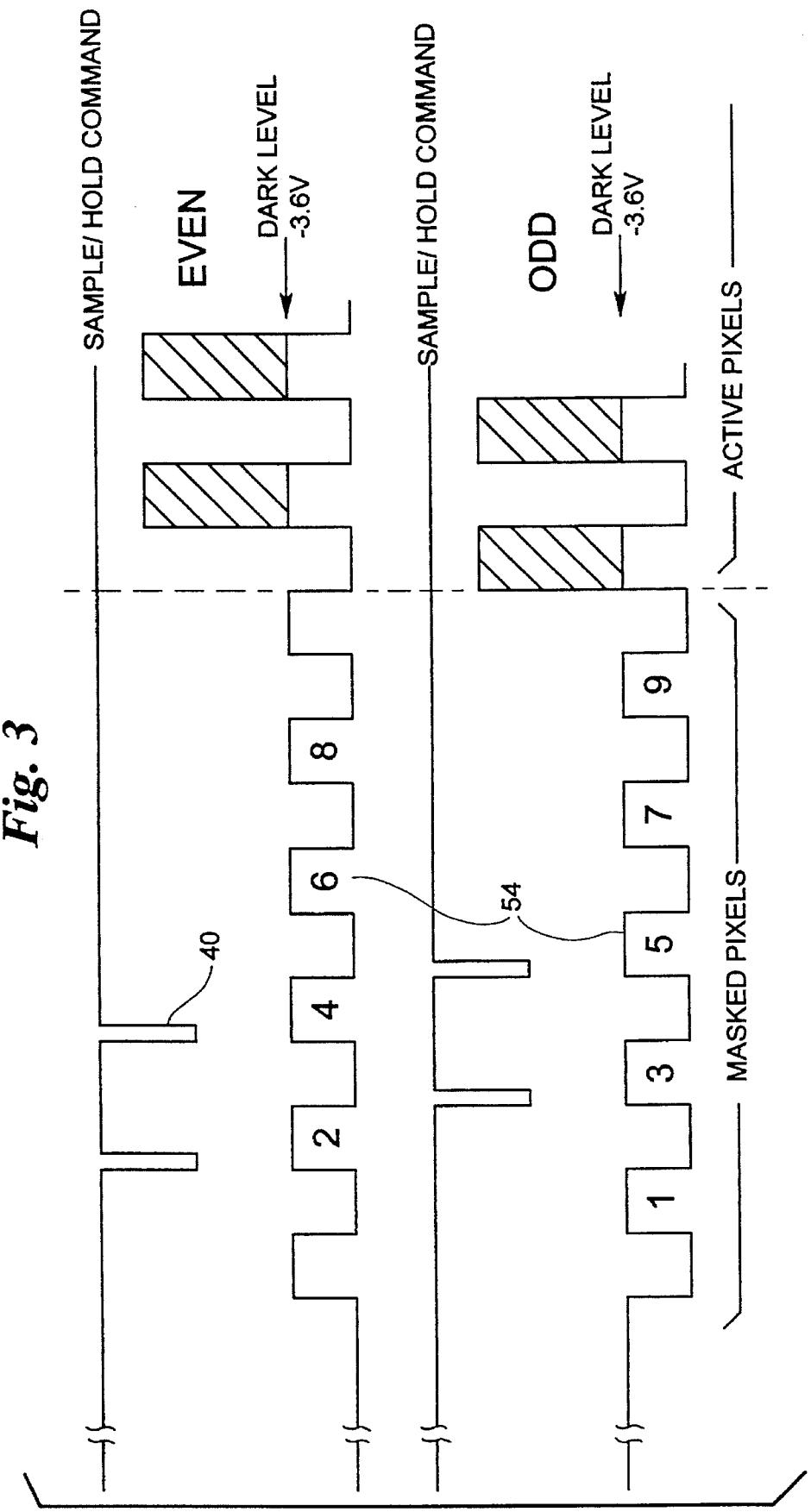
FIG. 3 is a more detailed representation of some of the timing relationships of FIG. 2.

Referring now to FIG. 2, a schematic representation of the timing relationships between raw video input signal and the operation of auto zero circuit 10. The start of raw video signal 14 is indicated by a scan sync pulse 50 which is then followed by the actual video signal from the scan array in line scan camera 12. At the end of each camera scan period, a housekeeping period 52 is required to reset the operation of CCD camera 12 for the next scan period. The operation of auto-zero circuit 10 occurs at the start of each scan period, as indicated by sync pulse 50 when the raw video signal corresponding to the internally masked pixels is presented. It can be seen that auto-zero circuit 10 will update zero correction signal 20 at the start of each camera scan so that even variations in the DC dark level offset that might occur between camera scans can be compensated. FIG. 3 shows in more detail the timing relation between sample command 40 and internally masked pixels 54.

Figure 4A:
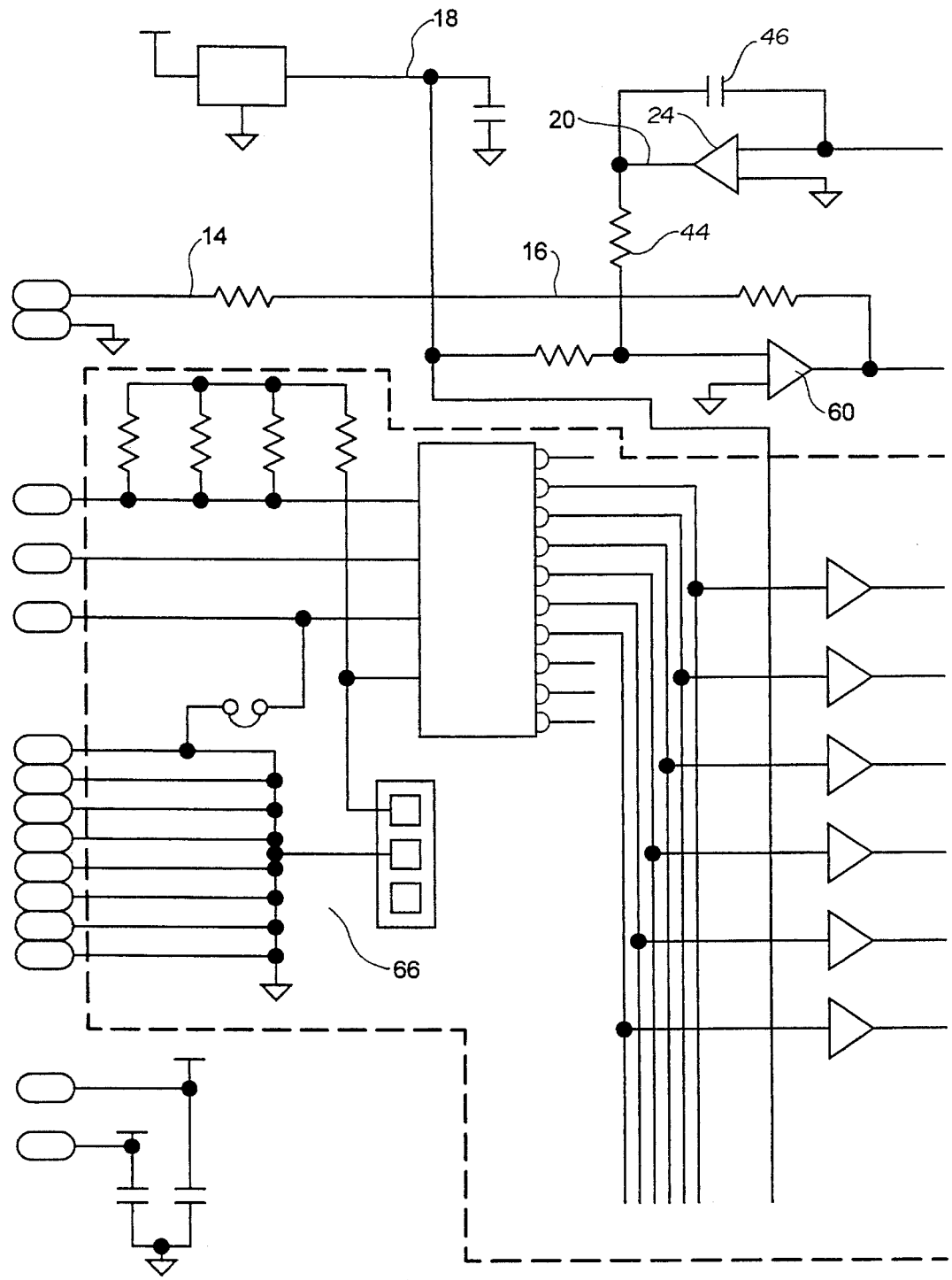
Figure 4B:
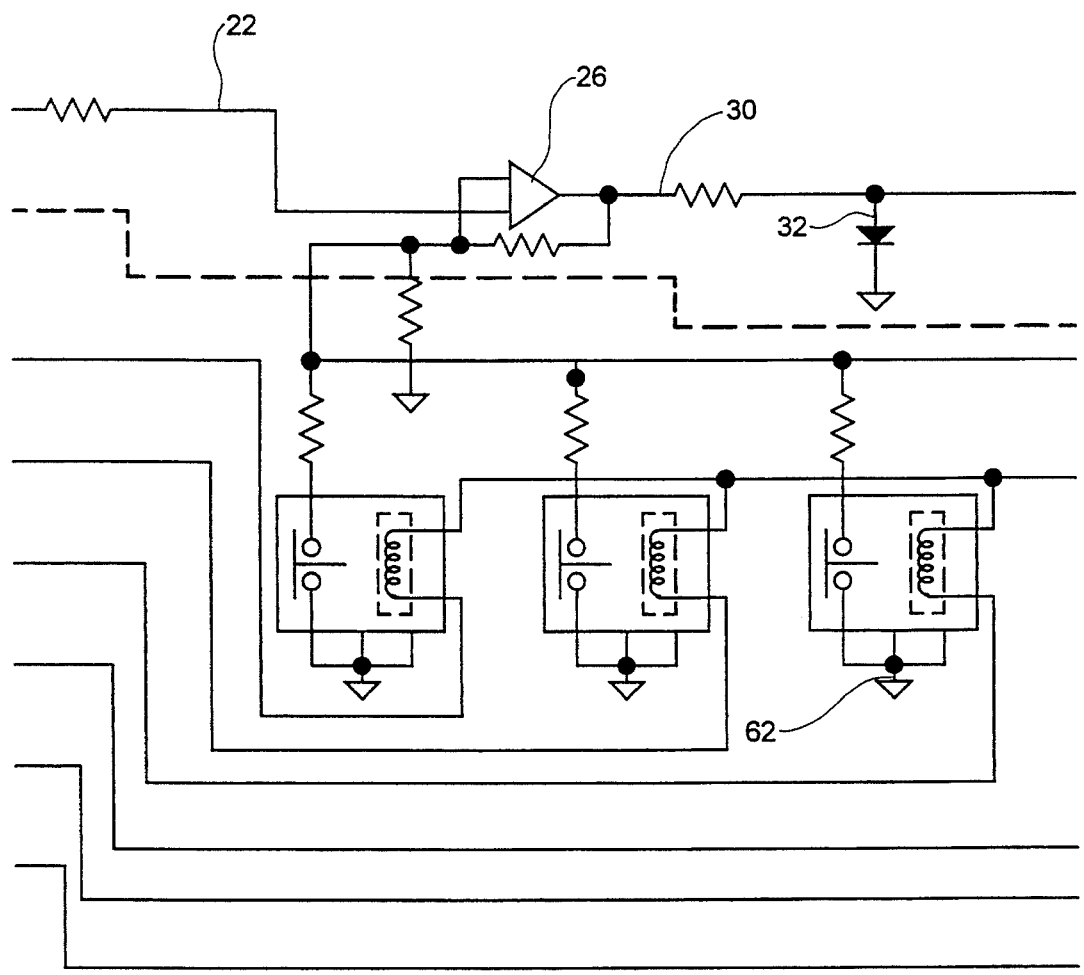
Figure 4C:
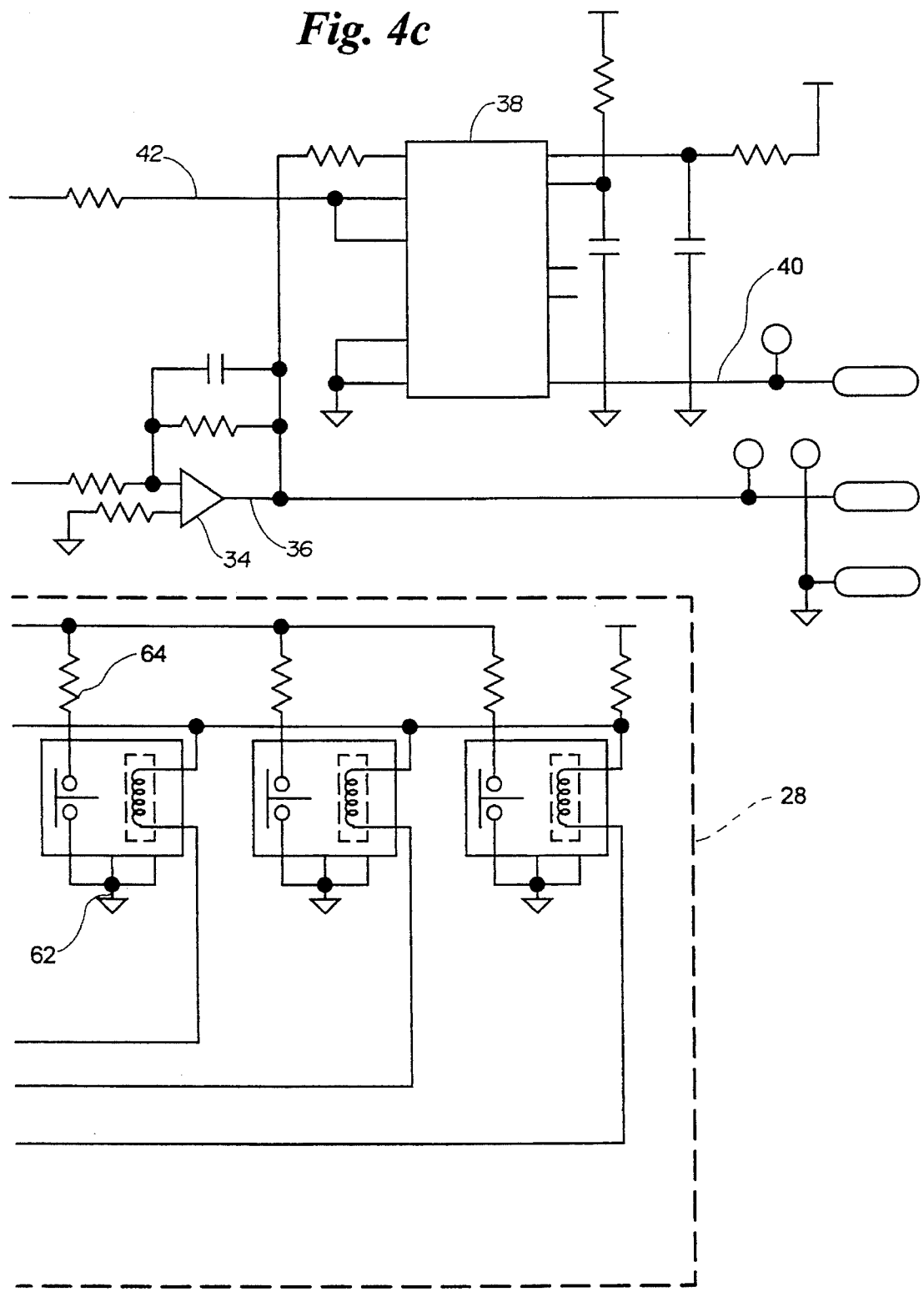

Referring now to FIGS. 4a, 4b and 4c, more detailed circuit diagrams of a preferred implementation of auto-zero circuit 10 is shown. In the preferred embodiment, auto-zero circuit 10 is replicated for both an odd and even pixel raw video signal. In addition, all timing and control functions are supplied by a microprocessor and timing generator circuitry external to auto-zero circuit 10. Raw video signal 14, fixed reference voltage 18 and zero correction signal 20 are received at summing node 16 that is the negative input of op amp 60, the positive input of which is connected to ground. Output 22 is supplied to the positive input of video gain amplifier 26, the negative input of which is connected to a series of relays 62, resistors 64, and jumpers 66 which form switch 28. Filtered video output 30 is clamped by Schottky diode 32 and is supplied to the negative input of buffer amplifier 34, the positive input of which is connected to ground. Video output signal 36 is available on the output of buffer amplifier 34 to be used in the downstream operation of the preprocessing circuit. Video output signal 36 is also connected to an input of sample/hold circuit 38, as is sample command 40. Output 42 of sample/hold circuit 38 is supplied to the negative input of difference integrator 24, the positive input of which is connected to ground.

It will be recognized that resistor 44 and capacitor 46 connected to difference integrator 24 establish a time period (tau) over which difference integrator 24 operates so as to average the error indicated by output 42 over a period of time. In the preferred embodiment, tau is chosen at 1 second to average the sampled video value over a series of consecutive scan time periods for CCD camera 12. In this way, zero correction signal 20 represents an effective running average of the DC dark level offset for the particular video input signal 14 over a period of time that is longer than a single camera scan time.

In a preferred embodiment, both the odd and even dark level offsets are individually tracked and corrected with a closed loop operation that assures a dark level offset below 1 LSB (6 mV) of a subsequent analog-to-digital (A/D) converter (not shown). Zero offset is maintained under all conditions of operation including changing the clock frequency or f-stop settings or offset drift of the line scan camera. In the case of the preferred embodiment, the manufacturer specifies the Reticon LC1902 line scan camera of the preferred embodiment has a dark level drift that is 5 mV/C.

In order to prevent the introduction of noise or error signals into output 30 it is essential that the pixel dark levels be at zero volts if the full capability of a high fidelity vision system is to be realized. The measure of the true video signal amplitude is with respect to the pixel dark level. Any significant dark level offset will cause an offset voltage and video signal interdependency that will lead to application measurement errors. In this case, significant offset is defined as any voltage greater than 3 LSB of the flash video converter of the next stage of the preprocessing circuit. Thus, for example, in a preprocessing circuit which utilizes an 8 bit flash converters (not shown) in the pixel combining process that has a full scale reference voltage of 1.50 V and 256 gray levels, the approximate value of a LSB is 6 mV, and a significant offset would be 18 mV. As a result, the various components of auto-zero circuit 10 are selected such that the adaptive feedback loop created by the circuit can sustain a dark level value for video output signal 30 at 0 V, ±9 mV.

It will be recognized that there are several alternate implementations of some of the functions auto-zero circuit 10 which could be implemented without departing from the intended scope of the present invention. Both the sampling function performed by sample/hold circuit 38 and the comparison and integration function of difference integrator 24 could be accomplished using digital sampling and digital signal processing techniques implemented, for example on a digital-signal-processor (DSP). While it is preferable that video gain amplifier 26 be included within the closed loop formed by auto-zero circuit 10, it is also possible to implement auto-zero circuit 10 without a video gain amplifier 26.

I claim:

1. An automatic dark level zeroing circuit for removing a dark level DC bias from an analog video signal generated by a charge-coupled device (CCD) camera, comprising:

a summing node that is DC-coupled to the CCD camera and combines the analog video signal and a zero correction signal to produce a zeroed video signal;

a video gain amplifier connected to the summing node that amplifies the zeroed video signal in response to a user-supplied setting to produce an output video signal;

a sample/hold circuit that samples the output video signal to produce a sampled video value in response to a sample command indicative of when the output video signal represents the dark level DC bias; and a difference integrator connected to the sample/hold circuit to subtract the sampled video value from a zero voltage value to produce the zero correction signal, such that the automatic dark level zeroing circuit forms an adaptive feedback loop that removes the dark level DC bias from the analog video signal.

2. The automatic dark level zeroing circuit of claim 1 further comprising:

a clamp diode connected at an output of the video gain amplifier to clip values in the output video signal that contain non-useful information.

3. The automatic dark level zeroing circuit of claim 1 further comprising:

a reference voltage supplied to the summing node, the reference voltage being a fixed voltage value substantially equal to and polarity from the dark level DC bias.

4. The automatic dark level zeroing circuit of claim 1 further comprising:

an output buffer connected to an output of the video gain amplifier for buffering the output video signal to achieve impedance matching for subsequent processing and to isolate the video gain amplifier from processing outside of the adaptive feedback loop.

5. The automatic dark level zeroing circuit of claim 1 wherein the output video signal is maintained within 0 V, ± a nominal voltage variance that is less than a voltage variance of 3 least significant bits (LSB) of a flash analog-to-digital (A/D) converter that receives the output video signal.

6. The automatic dark level zeroing circuit of claim 1 wherein the sample command indicative of when the output video signal represents the dark level DC bias occurs in coincidence with that portion of the analog video signal representative of one or more pixel photosites in a scan array of the CCD camera which are internally masked to represent a dark level value.

7. An automatic dark level zeroing circuit for removing a dark level DC bias from an analog video signal generated by a charge-coupled device (CCD) camera, comprising:

a summing node that is DC-coupled to the CCD camera and combines the analog video signal and a zero correction signal to produce a zeroed video signal;

a video gain amplifier connected to the summing node that amplifies the zeroed video signal in response to a user-supplied setting to produce an output video signal;

means for sampling the output video signal to produce a sampled video value in response to a sample command indicative of when the output video signal represents the dark level DC bias; and means for averaging the sampled video value over a plurality of scan times for the CCD camera to produce the zero correction signal, such that the automatic dark level zeroing circuit forms an adaptive feedback loop that removes the dark level DC bias from the analog video signal.

8. The automatic dark level zeroing circuit of claim 7 wherein the means for sampling comprises a sample/hold circuit that samples the output video signal to produce the sampled video value in response to the sample command indicative of when the output video signal represents the dark level DC bias.

9. The automatic dark level zeroing circuit of claim 7 wherein the means for averaging comprises a difference integrator connected to the means for sampling to subtract the sampled video value from a zero voltage value to produce the zero correction signal.

10. The automatic dark level zeroing circuit of claim 7 wherein the means for sampling and the means for averaging comprise an analog-to-digital (A/D) converter, a digital-signal-processor (DSP) and a digital-to-analog (D/A) converter for producing the zero correction signal.

11. An automatic dark level zeroing circuit for removing a dark level DC bias from an analog video signal generated by a charge-coupled device (CCD) camera, comprising:

a summing node that is DC-coupled to the CCD camera and combines the analog video signal and a zero correction signal to produce a zeroed video signal;

a reference voltage supplied to the summing node, the reference voltage being a fixed voltage value substantially equal to and polarity from the dark level DC bias;

means for sampling the zeroed video signal to produce a sampled video value in response to a sample command indicative of when the zeroed video signal represents the dark level DC bias: and means for averaging the sampled video value over a plurality of scan times for the CCD camera to produce the zero correction signal, such that the automatic dark level zeroing circuit forms an adaptive feedback loop that removes the dark level DC bias from the analog video signal.

12. An automatic dark level zeroing circuit for removing a dark level DC bias from an analog video signal generated by a charge-coupled device (CCD) camera, comprising:

a summing node that is DC-coupled to the CCD camera and combines the analog video signal and a zero correction signal to produce a zeroed video means for sampling the zeroed video signal to produce a sampled video value in response to a sample command indicative of when the zeroed video signal represents the dark level DC bias: and means for averaging the sampled video value over a plurality of scan times for the CCD camera to produce the zero correction signal, such that the automatic dark level zeroing circuit forms an adaptive feedback loop that removes the dark level DC bias from the analog video signal and the zeroed video signal is maintained within 0 V, ± a nominal voltage variance that is less than a voltage variance of 3 least significant bits (LSB) of a flash analog-to-digital (A/D) converter that receives the zeroed video signal.

13. The automatic dark level zeroing circuit of claim 7 wherein the sample command indicative of when the output video signal represents the dark level DC bias occurs in coincidence with that portion of the analog video signal representative of one or more pixel photosites in a scan array of the CCD camera which are internally masked to represent a dark level value.

* * * * *